(12) United States Patent
Sudarsan et al.

(10) Patent No.: US 10,869,220 B2
(45) Date of Patent: Dec. 15, 2020

(54) CONGESTION CONTROL IN A WIRELESS COMMUNICATION NETWORK

(71) Applicant: NOKIA SOLUTIONS AND NETWORKS OY, Espoo (FI)

(72) Inventors: Padmavathi Sudarsan, Naperville, IL (US); Paul Stephens, Long Grove, IL (US); William Macleod, Carp (CA); Reza Mohammad Rokui, Kanata (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/789,802

(22) Filed: Feb. 13, 2020

(65) Prior Publication Data

US 2020/0267596 A1 Aug. 20, 2020

(30) Foreign Application Priority Data

Feb. 15, 2019 (FI) ...................................... 20195120

(51) Int. Cl.
*H04W 28/02* (2009.01)
*H04W 72/04* (2009.01)
*H04W 36/22* (2009.01)

(52) U.S. Cl.
CPC ....... *H04W 28/0289* (2013.01); *H04W 36/22* (2013.01); *H04W 72/0486* (2013.01)

(58) Field of Classification Search
CPC ............. H04W 28/0289; H04W 36/22; H04W 72/0486
See application file for complete search history.

(56) References Cited

U.S. PATENT DOCUMENTS

2013/0010598 A1\* 1/2013 Ludwig .................. H04L 47/10
370/235
2013/0308446 A1\* 11/2013 Muto .................... H04W 76/36
370/230

(Continued)

FOREIGN PATENT DOCUMENTS

EP 2530899 A1 12/2012
EP 2 725 849 A1 4/2014

OTHER PUBLICATIONS

Extended European Search Report dated Jun. 4, 2020 corresponding to European Patent Application No. 20156831.8.

(Continued)

*Primary Examiner* — Jael M Ulysse
(74) *Attorney, Agent, or Firm* — Squire Patton Bggs (US) LLP

(57) ABSTRACT

There is provided a method and an apparatus performing the method, the method comprising monitoring one or more user equipment via a first interface; receiving network information from a transport layer element via a second interface between a network layer and a transport layer; determining, based at least on the monitoring of the one or more user equipment and the network information, congestion or degradation associated with the one or more user equipment; identifying a cause of the congestion or degradation associated with the one or more user equipment; and performing one or more action to mitigate or remove the cause of the congestion or degradation.

14 Claims, 6 Drawing Sheets

(56) References Cited

U.S. PATENT DOCUMENTS

| | | | | |
|---|---|---|---|---|
| 2014/0003242 | A1* | 1/2014 | Nadas | H04L 47/32 370/235 |
| 2014/0341041 | A1* | 11/2014 | Velev | H04W 4/70 370/236 |
| 2015/0138982 | A1 | 5/2015 | Wei et al. | |
| 2015/0289195 | A1* | 10/2015 | Gogic | H04W 74/0833 370/230 |
| 2015/0341839 | A1* | 11/2015 | Kim | H04W 16/32 370/331 |
| 2016/0164791 | A1* | 6/2016 | Zahemszky | H04L 47/12 370/235 |
| 2017/0063435 | A1* | 3/2017 | Christensson | H04W 28/0236 |
| 2017/0302553 | A1 | 10/2017 | Zafer et al. | |
| 2017/0373950 | A1* | 12/2017 | Szilagyi | H04L 43/00 |
| 2018/0212845 | A1 | 7/2018 | Eriksson et al. | |
| 2018/0242190 | A1* | 8/2018 | Khoryaev | H04W 28/0284 |
| 2018/0287696 | A1* | 10/2018 | Barbieri | H04W 36/22 |
| 2018/0316615 | A1 | 11/2018 | Shaw et al. | |
| 2019/0166052 | A1* | 5/2019 | Hadorn | H04W 28/0231 |

OTHER PUBLICATIONS

K. Kondepu et al: "Orchestrating lightpath recovery and flexible functional split to preserve virtualized RAN connectivity," Journal of Optical Communications and Networking, Institute of Electrical and Electronics Engineers, vol. 10, No. 11, Nov. 1, 2018, pp. 843-851, XP011697660.

Claudio Coletti et al: "O-RAN: Towards an Open and Smart RAN Acknowledgements," Oct. 1, 2018, pp. 1-19, XP055697862.

Apr. 1, 2020 Office Action issued in Korean Patent Application No. 10-2020-0018201.

Finnish Search Report dated Aug. 30, 2019 corresponding to Finnish Patent Application No. 20195120.

M. Anuradha et al. "Cross-layer based congestion detection and routing protocol using fuzzy logic for MANET," Wireless Networks, vol. 23, No. 5, Feb. 20, 2016, pp. 1373-1385.

Office Action dated Aug. 30, 2019 corresponding to Finnish Paten Application No. 20195120.

Communication of Acceptance dated Feb. 10, 2020 corresponding to Finnish Patent Application No. 20195120.

* cited by examiner

CONGESTION CONTROL IN A WIRELESS COMMUNICATION NETWORK

TECHNICAL FIELD

The invention relates to communications.

BACKGROUND

In a wireless communication network, congestion may cause degradation of services provided to user equipment. Therefore, it may be beneficial to provide new solutions that target to mitigate or remove detected or predicted end user experience degradation. For example, mitigating or removing congestion may improve quality of services provided to the user equipment.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
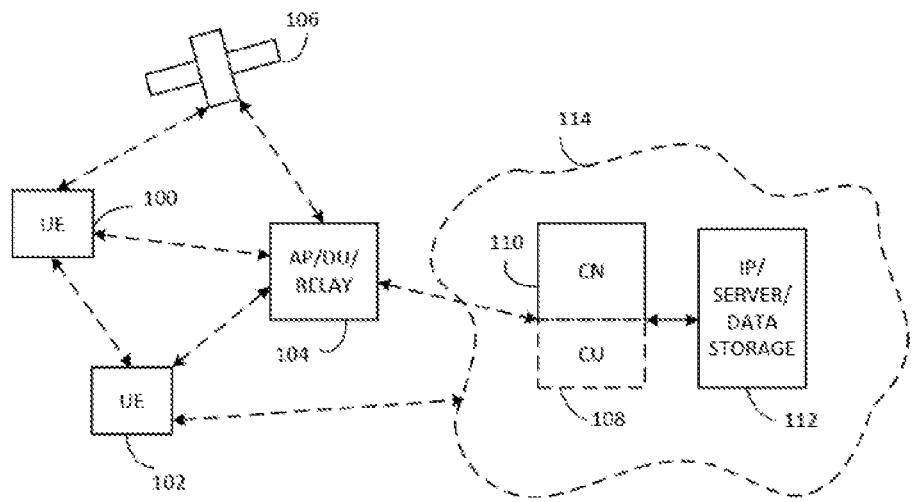
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called, user equipment (UE), user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and near-real time functions being carried out in a centralized manner (in a centralized unit, CU 108), for example.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

5G may simultaneously deliver multiple services to users (e.g. UE, such as mobile or smart phones) and businesses across multiple industries, vertical, and has the potential to support higher data rates than previous network structures. The improvements brought by 5G may enable autonomous driving, improving road safety, connected healthcare supporting remote regions and emerging markets, and/or augmented & virtual reality, for entertainment, training, home and industrial uses. Achieving the full potential of 5G may benefit from an end-to-end architecture approach that may support a wide range of technical and commercial requirements to provide stringent, reliable, and predictable service levels relative to capacity, throughput, and/or latency. The network slicing technology is proposed to meet the demand of the multitude of applications and new use cases that 5G may support. These new applications and use cases will place different requirements on the network in terms of functionality, and their performance requirements may vary. Network slicing may allow multiple virtual networks to be created on top of a common shared physical infrastructure. The virtual networks are then customized to meet the specific needs of applications, services, devices, customers and/or operators. In the context of the present application, network slice may be understood as a dedicated and/or determined resource for network operation (e.g. transmission of data). As the network slices may be virtual, their configuration may be dynamic, and thus network slicing technology may support variety of different use cases.

Capabilities like network slicing and closed looped optimization may be used to deliver network efficiency and End-to-End (e2e) user experience. Edge intelligence, closed looped optimization and automation have been the center focus in the industry today and various standards bodies, fora are discussing solutions to address this. The expanded service applicability, combined with the increased 5G Radio Frequency (RF) bandwidth capabilities may benefit from a closed loop optimized system for ensuring that the network may selfheal and/or optimize under congestion constraints. Advent of 5G has introduced various mechanisms like network slicing, closed loop Radio Access Network (RAN) optimization to address low latency use cases and enhance user experience. However, there seems to be a need for cross domain knowledge and specific closed loop near real time adjustments particularly across the network layer (or RAN layer) and transport layer. The inventors have advantageously noted that congestion may most likely occur in the transport layer, and may cause degradation to services provided for UEs. For instance, resources in a RAN, without communication between the different layers, may be adjusted based on some transient load spike but may not guarantee the result since there could be congestion in the transport layer. There is no mechanism in place today for near real time or real time exchange of information across the transport and RAN layers. Such as mechanism may improve the overall performance of the wireless communication network and/or improve Quality of Service (QoS) experienced by the UEs.

Figure 2:
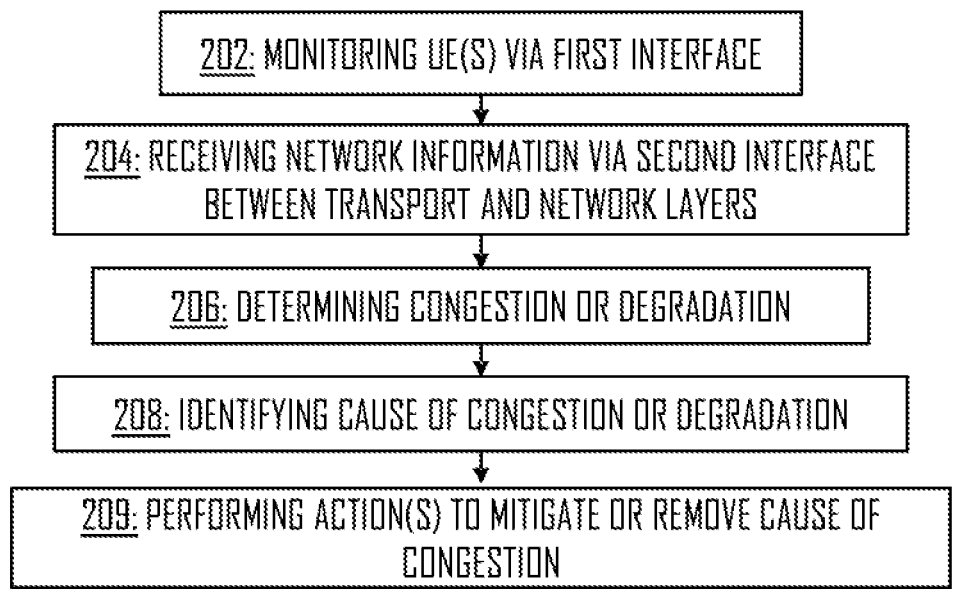
FIGS. 2 and 3 illustrate block diagrams according to some embodiments.
Figure 3:
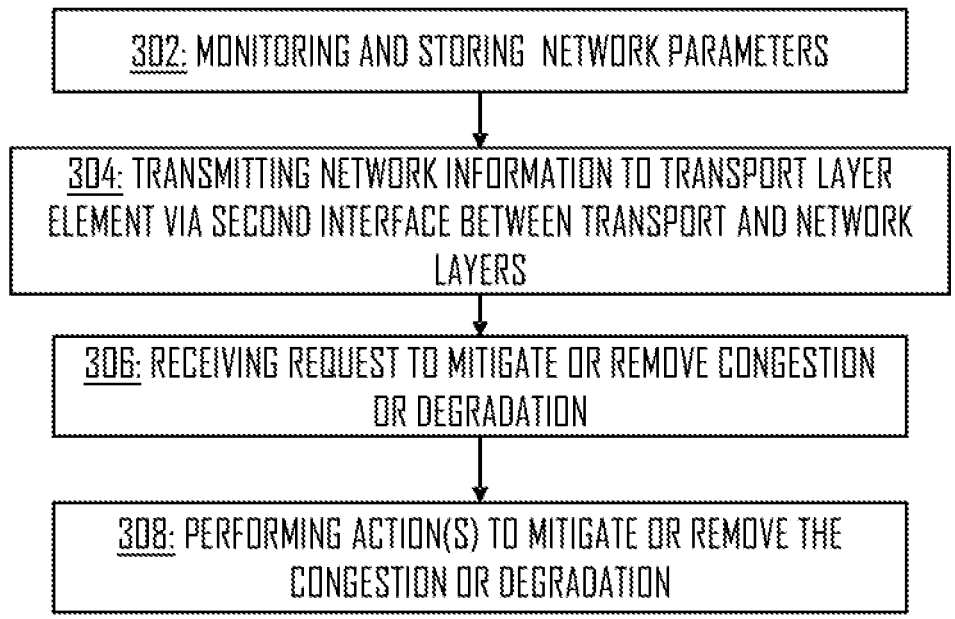

FIGS. 2 and 3 illustrate flow diagrams according to some embodiments. Referring to FIG. 2, there is provided a method in a network layer element of a wireless communication network (e.g. network of FIG. 1), the method comprising: monitoring (block 202) one or more user equipment via a first interface; receiving (block 204) network information from a transport layer element via a second interface between a network layer and a transport layer; determining (block 206), based at least on the monitoring of the one or more user equipment and the network information, congestion or degradation associated with the one or more user equipment; identifying (block 208) a cause of the congestion or degradation associated with the one or more user equipment; and performing (block 209) one or more action to mitigate or remove the cause of the congestion or degradation.

Referring to FIG. 3, there is provided a method in a transport layer element of a wireless communication network (e.g. network of FIG. 1), the method comprising: monitoring (block 302) one or more network parameters and storing network information based on the monitoring; transmitting (block 304) the network information to a network layer element via a second interface between a network layer and a transport layer, the network layer element monitoring one or more user equipment via a first interface; receiving (block 306), via the second interface from the network layer element, a request to perform at least one action to mitigate or remove a cause of a congestion or degradation associated with the one or more user equipment; and performing (block 308) the at least one action to mitigate or remove the cause of the congestion or degradation.

The UE(s) discussed with respect to FIGS. 2 and 3 may comprise, for example, UE(s) 100, 102.

The network layer element may, for example, be a RAN module or function. In some example embodiments, the network layer element is referred to as RAN Intelligent Module (RIM). In some embodiments, the network layer element may be associated with RAN Intelligent Controller (RIC) or Virtualized Radio Access Network (VRAN). Thus, for example, the network layer element may be an independent microservice or can co-reside with the CU/VRAN or RAN management. RIM may, in some embodiments, reside in RIC. RIC may be defined by the Open RAN Alliance. However, RIM is not necessarily restricted to RIC or Open RAN Alliance specific solutions.

The network layer element may monitor UEs of the wireless communication network (e.g. RAN) via the first interface. In some embodiments, the first interface is referred to as E2 interface.

The transport layer element may, for example, be a Transport Domain Management Controller (TDMC) or a similar module or function. The transport layer element may monitor performance of the wireless communication network. Monitored metric(s) may comprise latency, jitter, packet loss, bandwidth, and/or network connectivity. For example, the transport layer element may gather network information including telemetry on Internet Protocol (IP) or Multiprotocol Label Switching (MPLS) services, tunnels and/or paths. The telemetry may include information on bandwidth utilization, for example. The network information may additionally or alternatively include Operations and Management (OAM) data on the IP/MPLS services, tunnels, and/or paths such as latency, jitter, and/or packet loss data. The network information may additionally or alternatively include Threshold Crossing Alert (TCA) against one or more metrics of the telemetry and/or OAM data. Thus, for example, the threshold(s) may be used to determine the congestion or degradation situation, and the consequently action(s) may be triggerd if the one or more thresholds are exceeded. For example, if bandwidth, latency, jitter, packet loss and/or network connectivity exceeds a threshold, the actions of block 208 and/or 209 may be triggered. More than one threshold may be utilized at a time, for example, such that at least two thresholds (e.g. each for a different metric) need to be exceeded before the action is triggered. However, use of one threshold may suffice. The transport layer element may be associated with Software-defined networking (SDN) controller.

One of the aspects of the present solutions is the combination of the transport and network (e.g. RAN) layer data. Transport and network layers may be referred to also as transport and network domains respectively. The combination of interlayer data may optimize resource usage and/or deliver/maintain required user experience (e.g. required QoS). The end user experience may be improved by allowing the network layer element to monitor various aspects of cloud resources and/or transport network, and take coordinated actions across the transport and network layers. Subsequently, the network layer element may, for example, instruct the transport layer element to perform certain adjustments in the transport network, in conjunction with the network layer element, actions to maintain or improve user experience. For this purpose, the second interface between the network and transport layers, and specifically between the transport layer element and the network layer element, is introduced and utilized.

The communication via the second interface may be near real time (e.g. delay in seconds) or real time bi-directional communication. So, the second interface (can be referred to as network layer-transport layer interface) may enable near real time communication between the two layers. The second interface may enable the network layer element 410 to retrieve information, such as multi cell view, transport from the transport layer element, as input to RAN algorithms (e.g. bandwidth, latency, topology path and the like) on demand in near real time and/or periodically (e.g. on demand retrieval of information and/or scheduled retrieval of information). Further, the second interface may enable the network layer element 410 to pus policy change to transport layer element 420 based on the analysis in the element 410. For example, the element 420 may send network statistics as aggregated and/or correlated to the network element 410. The transmission may be on demand and/or periodic. The periodic transmission may be controlled by the element 410 and/or element 420. For example, the network statistic may be transmitted every five minutes but this time frame may be controllable.

The network layer element 410 and/or the transport layer element 420 may support Multi-Vendor (MV). So, the interfaces (e.g. second interface) may be configurable depending on vendor needs. However, it is possible to utilize the second interface in a standardized environment depending on future needs.

Figure 4:
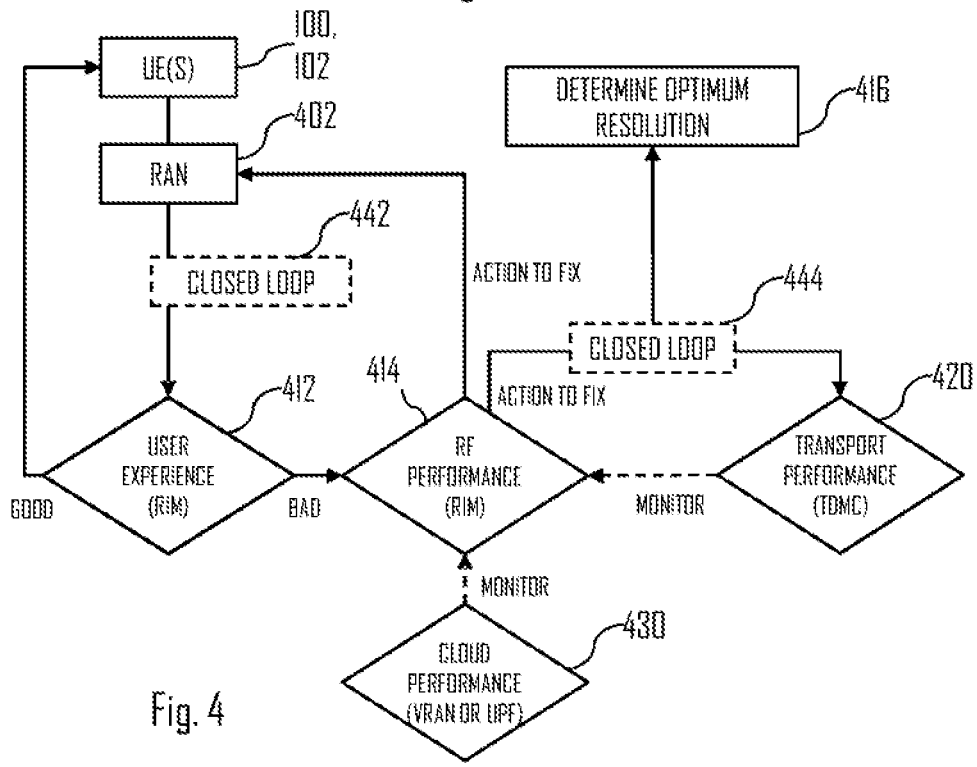
FIG. 4 illustrates an embodiment.

FIG. 4 illustrates an overview of the present solution according to an embodiment. Referring to FIG. 4, network layer element is illustrated with blocks 412, 414, 416. The network layer element, in general, may be referred to with reference sign 410 as shown later in FIGS. 5, 6, 7, and 9. The network element 410 may comprise any combination of blocks 412, 414, 416, for example.

Transport layer element is indicated with reference sign 420 and cloud resource monitoring (e.g. VRAN or User Plane Function (UPF)) is indicated with reference sign 430. Cloud resource monitoring 430 may refer to monitoring virtual resources run on physical resources, wherein the cloud resources may be used to provide resources for the communication in the system. For example, cloud resources may be used to provide network slices.

As shown in FIG. 4, different services may be provided for the UE(s) 100, 102 by the RAN 402 (or more generally, wireless communication network). There can be many different types of UEs which are served with various services.

The network layer element 410 may monitor the UE(s) 100, 102 to determine and/or ensure that user experience meets Service Level Agreement (SLA) metric targets. Specifically, this monitoring may be performed by a user experience engine functioning 412 inside the network layer element 410. Based on the monitoring, continuous adjustments may be made by the network layer element 410.

Furthermore, the RIM may obtain network information via the second interface from the transport layer element 420. Additionally, information on cloud resources may be obtained from the element 430. These are illustrated with arrows in FIG. 4. So, the network layer element 410 may continuously monitor UEs and their SLA targets, cloud resource metrics and/or transport layer metrics in closed loop 442.

If or when optimal user experience may not be maintained for existing service (e.g. caused by a need for new service request or changing network conditions), the network layer element 410 may analyze the various metrics in a continuous closed loop 444 to determine the optimum or at least better resolution (block 416). The network layer element 410 may instruct the transport layer element 420, in conjunction with the network layer element, actions towards the RAN 402 to maintain overall end user experience and/or allow for new services to be offered. Details of different solutions are discussed below. However, as shown in FIG. 4, actions may be triggered, by the network layer element 410, directly towards the RAN 402 and/or towards transport layer element 420. The transport layer element 420 may further trigger action(s) toward RAN 402, for example.

Let us then look closer on some embodiments shown in FIGS. 5, 6, 7, 8, and 9. Referring first to embodiment of FIG. 5, the performing the one or more action (block 209) comprises requesting 588, by the network layer element 410 via the second interface, the transport layer element 420 to increase bandwidth between a distributed unit 504 (DU) and a control unit 520 (CU) serving the one or more user equipment 100, 102. The transport layer element 420 may increase the bandwidth based on the request. Basis of such request may be in that the network layer element 410 determines that the congestion associated with the terminal device 100, 102 is caused by congestion between the DU 504 and the CU 520. Such congestion may be referred to herein as transport network congestion. So for example, if service demand increases or already has increased, the network layer element 410 may determine transport network congestion based on, for example, network information 586 (similarly as in block 204) obtained from the transport layer element 420 that monitors and stores 584 the network statistics (e.g. as in block 302). Moreover, similarly as in block 202, the network layer element 410 may monitor 582 the UE(s) 100, 102 and their SLA metric targets. Network information and network statistics may refer to the same metrics, such as jitter, latency, packet loss, bandwidth, and/or network connectivity.

Figure 5:
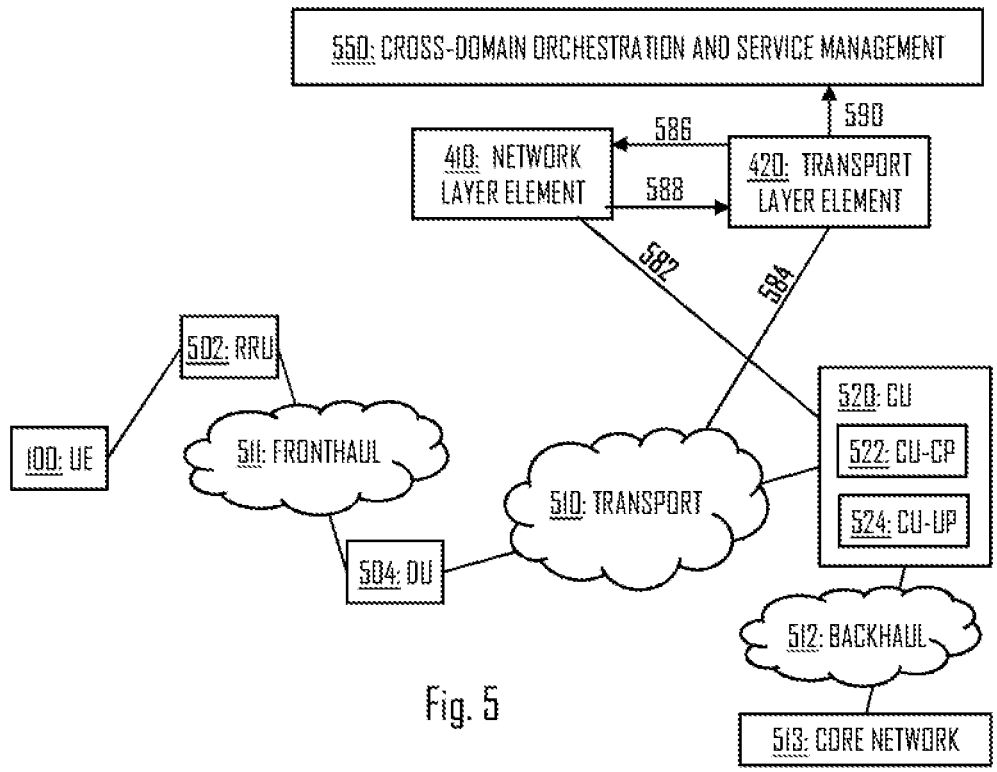
FIG. 5 illustrates an embodiment in which bandwidth of the serving connection is increased.

Referring to FIG. 5, the CU 520 and DU 504 may be connected with each other, for example, via transport network 510 or transport cloud (e.g. L3 transport network or cloud) entities and/or interfaces (not shown in FIG. 5). The transport network 510 may sometimes be referred to as midhaul or midhaul connection (e.g. L3 midhaul). The illustrated cloud-RAN network is one example of enabling distributed system in which DUs and CUs are connected with each other via transport network (e.g. transport network 510). DU 504 may further control one or more Remote Radio Unit (RRU) 502 that may provide the radio signals to and from the UE 100, 102. Such DU-CU-RRU construction is generally referred to as distributed communication system. RRU 502 may be sometimes referred to more broadly as network node 502. For example, the DU 504 may be connected to the RU 502 via cloud interface 511 which may be referred to as fronthaul or fronthaul connection 511 (e.g. L3 fronthaul).

Furthermore, the CU 520 may be connected to core network 513 via cloud interface 512 which may be referred to as backhaul or backhaul connection 512 (e.g. L3 backhaul). The core network 513 may comprise element(s) such as Access and Mobility Management Function (AMF), Session Management Function (SMF) and/or UPF.

Figure 6:
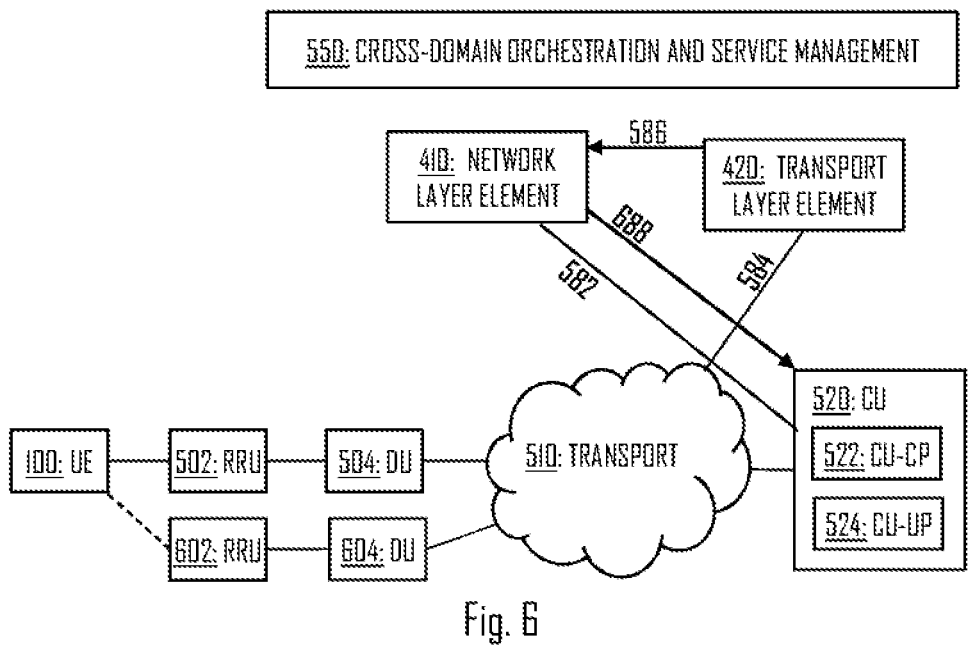
FIG. 6 illustrates an embodiment in which serving network node is changed.
Figure 7:
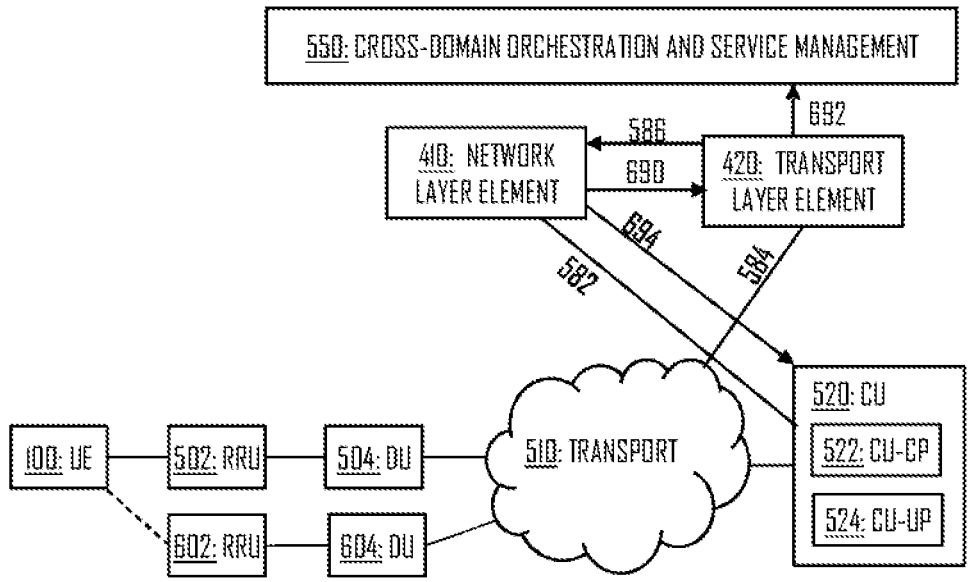
FIG. 7 illustrates an embodiment in which bandwidth of a new serving connection is increased and serving node is changed.

Although the fronthaul 511, backhaul 512, and core network 513 are not shown in FIGS. 6 and 7, similar or same elements may be utilized.

Looking further on the details of the embodiment of FIG. 5, network layer element 410 may monitor 582 UE performance/state via first interface. For example, UE performance may be compared against the one or more SLA metrics. The transport layer element 420 may collect 584 network statistics. The transport layer element 420 may forward 586 the network statistics to the network layer element 410. The network layer element 410 may determine, based on the network statistics and/or the UE performance/state, that UE 100, 102 is experiencing sustained drop in user experience and/or throughput (i.e. at RRU 502) caused by transport network congestion. Thus, the congestion determined and its cause may be identified.

The network layer element 410 may request 588 the transport layer element 420 to increase bandwidth between DU 504 and CU 520. The request may be based at least on determining that the congestion is the transport network congestion caused by the congestion between the DU and CU. So, in some embodiments, the bandwidth increase is requested in bits per second (bps) (e.g. x bps increase may be requested, where x is a positive number). In some embodiments, the request message 588 comprises an explicit information element indicating the requested bandwidth increase or requested bandwidth.

If the transport layer element 420 determines that it can increase bandwidth without modifying transport path, the transport layer element 420 may increase the bandwidth based on the request. If the bandwidth cannot be increased, the network layer element 420 may negatively acknowledge the request 588.

Further, the transport layer element 420 may notify 590 cross-domain orchestration and service management entity 550 (e.g. e2e orchestrator) about the bandwidth increase.

In an embodiment, the congestion is determined, by the network layer element 410, to be between the DU 504 and the CU-User Plane 524 (CU-UP). Therefore, the bandwidth may be requested to be increased between the DU 504 and the CU-UP 524. Accordingly, the transport layer element 420 may increase bandwidth between the DU 504 and the CU-UP 524. It is noted that, although not shown in FIG. 5, the DU 504 may be connected separately with CU-UP 524 and CU-Control Plane 522 (CU-CP). Therefore, it may be beneficial to increase bandwidth only for the user plane data to save valuable resources.

Referring now to FIG. 6, similar elements and steps 582, 584, 586 are shown as in FIG. 5. However, in the example embodiment of FIG. 6, the performing the one or more action (block 209) comprises: determining, by the network layer element 410, that a different network node 602 is associated with a lower congestion than a currently serving network node 502, wherein the coverage provided by the network nodes 502, 602 is at least partially overlapping (i.e. coverage provided by the currently serving network node and the different network node); and causing transferring the one or more user equipment 100, 102 from the currently serving network node 502 to the determined different network node 602. This solution may be an alternative to the solution provided in FIG. 5, for example, and may be utilized if the different network node 602 with lower congestion (e.g. no congestion) is available. For example, the network node 602 (e.g. RRU 602) may be connected to different DU 604, and therefore the congestion between the DU 604 and CU 520 (or CU-CP 524) may be lower than between DU 504 and CU 520 (or CU-CP 524). The lower congestion may be determined based on the network statistics received 586 from the transport layer element 410.

In an embodiment, the lower congestion means that the network layer element 410 determines that there is no congestion.

So, the network layer element 410 may determine that UE 100, 102 is experiencing sustained drop in user throughput (i.e. in the service provided by network node 502) caused by transport network congestion. The network layer element 410 may determine, based on network statistics, that network node 602 may provide sufficient overlapping coverage from another site with no transport congestion or at least lower congestion that is determined to be low enough to provide service quality that meets the SLA metrics. The network layer element may transfer 688 the UE 100, 102 from network node 502, 602. This transfer may be understood as a sort of a handover (e.g. inter frequency handover) from one node to another. The transfer may be initated by the network layer element 410 transmitting a request to the RAN (e.g. CU 520). The request may comprise an update to the UE measurement configuration which may cause the UE 100, 102 to transfer from network node 502 to network node 602.

For example, the transfer from node 502 to 602 may be initiated if the bandwidth increase between DU 504 and CU 520 determined to be impossible or is denied by the transport layer element 420. Furthermore, the network node 602 having lower or no congestion may need to be available. So, in case the bandwidth of the existing RAN connection cannot be increased, an alternatively available RAN connection may be utilized for providing the service to the UE 100, 102.

Referring now to FIG. 7, a sort of a combination of solutions of FIGS. 5 and 6 is shown. Therefore, the performing the one or more action (block 209) may comprise requesting 690, by the network layer element 410 via the second interface, the transport layer element 420 to increase bandwidth between a distributed unit 604 and a control unit 520 (or CU-UP 524) that are associated with the determined different network node 602.

In an embodiment, the bandwidth is requested 690 to be increased prior to causing transferring the one or more user equipment from the currently serving network node 502 to the different network node 602. So, the bandwidth increase may be performed in advance, i.e. before the UE is transferred from serving node to the determined different node. In this case the bandwidth may be increased between the distributed unit 604 and the control unit 520. It is further noted that the RRU 602 (i.e. the different network node 602) may be associated with a different DU 604 than the serving RRU 502 which may be associated with DU 504. Both DUs 504, 604 may be associated with the same CU 520 or different CUs.

For example, steps 582, 584, 586 may be similar as in FIGS. 5 and 6. Further, the network layer element 410 may determine that UE 100, 102 is experiencing sustained drop in user throughput (i.e. in the service provided by network node 502) caused by transport network congestion. The network layer element 410 may determine, based on network statistics, that network node 602 may provide sufficient overlapping coverage from another site. However, it may further be determined that increase of bandwidth between the DU 604 and CU 520 (or CU-UP 524) is needed to meet the SLA metric requirement(s). Therefore, the network layer element 410 may request 690 the bandwidth increase for the new connection (i.e. between DU 604 and CU 520 (or CU-UP 524)). In the examples of FIGS. 6 and 7, the request may indicate the connection which bandwidth is requested to be increased.

The transport layer element 420 may report to the network layer element 410 whether or not the bandwidth increase was successful. If the bandwidth is increased successfully, the transport layer element 420 may so indicate to the network layer element 410. The network layer element 410 may thus determine that the bandwidth is increased so that the transfer from node 502 to node 602 is beneficial. The network layer element 410 may transfer 694 (i.e. after the bandwidth has been increased or is at least confirmed to be increased) the UE 100, 102 from node 502 to node 602. The transfer may be similar as in FIG. 6. That is, the transfer may be understood as a sort of a handover (e.g. inter frequency handover) from one node to another.

Further, the transport layer element 420 may indicate 692 the e2e orchestrator 550 about the bandwidth increase similarly as in FIG. 5.

Figure 8:
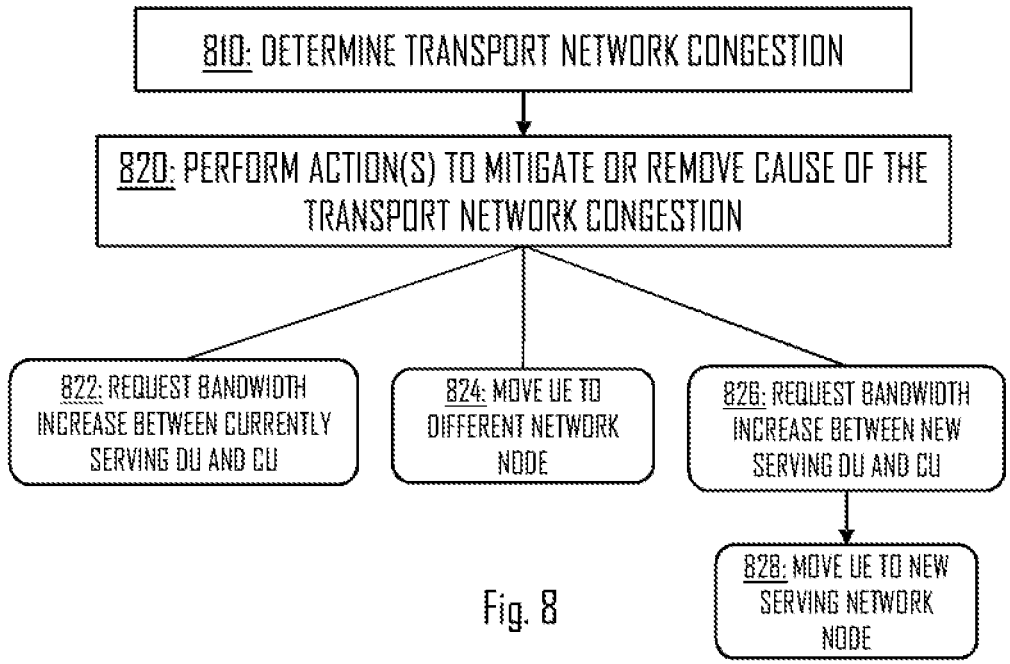
FIG. 8 illustrates an embodiment related to determining transport network congestion.

FIG. 8 illustrates an overview of the different solutions provided in FIGS. 5, 6, and 7. Referring to FIG. 8, the network layer element 410 may determine (block 810) transport network congestion (i.e. congestion between DU(s) and CU(s)). The determination may be based on closed-loop service intelligence, wherein the network and transport layers provide, via the second interface, the necessary data and information to determine the congestion and act accordingly mitigate or remove the congestion. Congestion may be understood as data congestion that may cause degradation of QoS, for example. The transport and network layer entities 420, 410 may include transport awareness of the Front haul, Mid-haul, Backhaul and/or the Internet/Service End Point interfaces. The transport layer entity 420 residing in any of the four interfaces defined above may provide a dynamic closed loop automation to the network layer entity 410 to allow for optimization (e.g. mitigation or removal of the cause of degradation).

The metrics based on which the congestion is determined (e.g. block 206) and the cause identified (e.g. block 208) may include real time and/or non-real time metrics. For example, the metrics may refer here to the network statistics transmitted from the transport layer entity 420 to the network layer entity 410. So, the second interface may support real time and/or non-real time exchange of network statistics or network information.

In an embodiment, the network nodes 502, 602 are situated on separate sites but provide at least partially overlapping coverage. Their transport connectivity may be associated with different paths as shown in FIGS. 6 and 7.

It is further noted that network node 602 may be associated with a different CU than CU 520. However, same CU 520 may be used to control both DUs 504, 604. Whether a different CU is used or not may be depend on the used network topology. However, connections between each DU and one or more CUs may be separate, and therefore their bandwidths may be increased (if increase is requested and possible) separately.

More generally, the congestion may be determined (block 206) based on, for example, one or more of the following measurements: Radio Resource Control (RRC) connection measurements, cell level radio bearer QoS related measurements, and/or radio resource utilization related measurements. Once congestion is determined the action(s) may be taken with transport condition aware intelligence/action. For example, the network layer element 410 may determine, based on the described measurement(s), that the congestion is transport network congestion or cloud resource congestion which is discussed later in more detail.

In response to determining of block 810, the network layer element 410 may perform the one or more actions to mitigate or remove the cause of the transport network congestion (block 820). These action(s) may comprise, for example, action of block 822 (action(s) as described with respect to FIG. 5), block 824 (action(s) as described with respect to FIG. 6) or block 826 and 828 (action(s) as described with respect to FIG. 7). For example, the network layer element 410 may first perform one of the actions and then try another if the first performed action is determined to be insufficient. Therefore, one or more of the described actions may be performed. If more than one action is performed, the performing may be subsequent or consecutive, for example.

Let us then consider cases where the congestion or degradation is determined to be caused by cloud resource congestion. Again, such determination by the network layer element 410 may be based on the UE monitoring (i.e. by the network layer element 410) and/or the network information or network statistics received from the transport layer element 420. Additionally or alternatively, the cloud performance monitoring element 430 may provide the network layer element 410 with information on the performance of the cloud resources. Therefore, the information received from the cloud performance monitoring element 430 may be used to determine the cloud resource congestion. For example, such information may indicate available resources, used resources, and/or total resources. For example, the information may indicate metrics like central processing unit (CPU) utilization, threshold(s), and/or alarm(s). The threshold(s) and alarm(s) may refer to CPU utilization threshold(s) and alarm(s), for example. So, in short, determining the congestion or degradation in block 206 and identifying the cause of the congestion or degradation in block 208 may be based on UE monitoring information (i.e. network layer element 410 monitors UEs via first interface), network statistics received from the transport layer element 420, and/or information on the performance of the cloud resources received from the cloud performance monitoring element 430. For example, the congestion or degradation may be caused by transport network congestion or cloud resource congestion which is now discussed in more detail with reference to FIG. 9.

Figure 9:
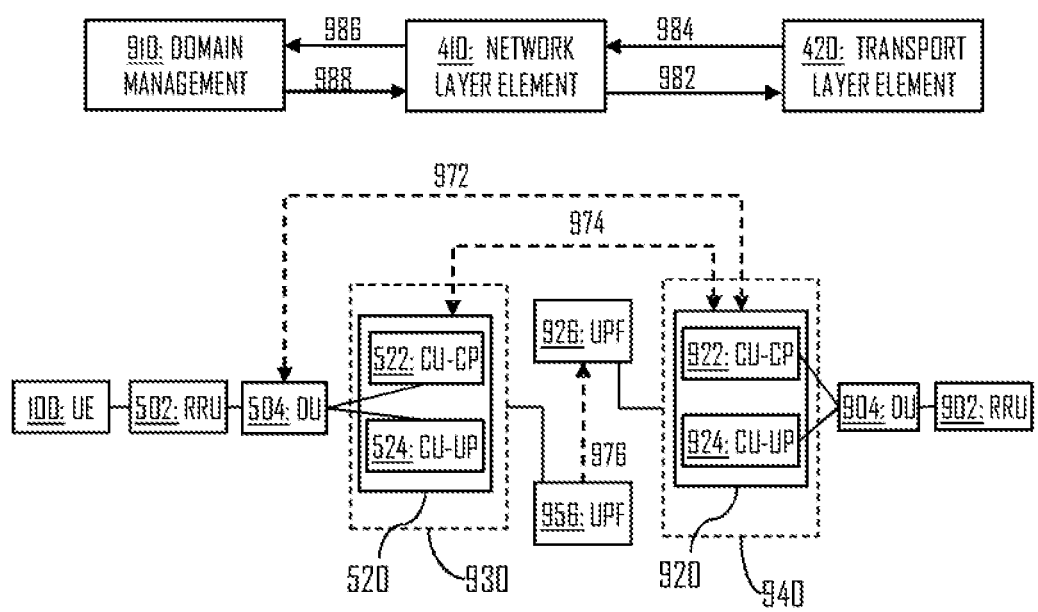
FIG. 9 illustrates an embodiment related to cloud resource congestion.

According to an embodiment shown in FIG. 9, the network layer element 410 is further configured to perform operations comprising: determining that a control unit 520 serving the one or more user equipment 100, 102 is experiencing congestion; and determining another control unit 920 for serving the one or more user equipment 100, 102, wherein the performing the one or more action (block 209) comprises requesting 982, via the second interface from the transport layer element, generation of at least one network slice for a new connection 972 between a distributed unit 504 serving the one or more user equipment 100, 102 and the another control unit 920.

For example, the another control unit 920 for serving the one or more user equipment 100, 102 may mean a control unit that is not suffering congestion (i.e. cloud congestion) or at least the congestion of the CU 920 may be determined to be lower than the serving CUs congestion.

The control unit 520 experienced congestion may be referred to as cloud resource congestion which may be caused by stringent or limited computing resources. For example, the control unit 520 may be provided by virtual resources (i.e. cloud resources) on physical resources. Regardless, in some cases it may not be possible to increase the resources for the control unit 520, and thus transfer to another control unit may be beneficial. In some embodiments, the cloud resources congestion may be reduced or removed by increasing resources to the control unit 520.

For example, a common issue facing the mobile network service provider industry may be how to optimally utilize cloud-based computing resources considering time-of-day shifts in mobility end user demand. For example, end user demand on the cloud resources (i.e. UE 100, 102 demanded resources) in a given or certain geo-graphical location may become congested, and may thus impact the end user experience. The elements 410, 420 may work in real-time to determine alternate cloud-based resources that can handle the incremental load (e.g. vRAN (CU-UP) load). The shift in end-user load may be handled in a real-time fashion, such that, alternate transport tunnel(s) (e.g. connections or tunnels 972, 974) may be established to an alternate cloud-based datacenter 940 (i.e. from datacenter 930 that may not have enough resources which may lead to congestion) that has the spare CPU/server capacity available. Once those transport tunnels are established, new E1/F1 connections may be created and finally, the network layer element 410 may progressively shift load from the congested CU 520 to non-congested CU 920. The criteria for selection of the user equipment (or in other words users) to be transferred from one CU to another CU of another datacenter may depend on the following (e.g. target may be to minimize disruption as much as possible):

1. Latency requirements and the latency budget for the new CU 920: determining that the application requirements match the latency budget;
2. Subscriber policy and network policy; and/or
3. Bandwidth demand/requirement for the new user.

The described process may be fully or partially automated procedure, and may apply artificial intelligence by determining past history of load/congestion and have the system predict this congested state, and thus, move traffic before the congestion occurs. The proposed solution enables more effective use of computing resources by enabling the DU 504 to be connected 972 to a new CU 920 which is provided on resources from a different datacenter 940 than the CU 520 which is determined to suffer from congestion. This enables dynamic resources utilization of scarce resources without the need to increase resources for a certain datacenter as resources may be used from one or more different datacenters, and particularly from one or more CUs provided by different datacenter(s).

In an embodiment with reference to FIG. 9, the distributed unit 504 serving the one or more user equipment 100, 102 is associated with a control unit 520 experiencing congestion, wherein performing the at least one action (i.e. in block 308 by the transport layer element 420) comprises generating, based on the request 982 via the second interface from the network layer element 410, at least one network slice for a new connection 972 between the distributed unit 504 and another control unit 920.

So, based on the request 982, the transport layer element 420 may generate (or in other words create) the at least one network slice for the new connection 972, and respond 984 to the network layer element 410 that the at least one network slice is generated.

At this point we note that the congestion of CU 520 may particularly refer to congestion of CU-UP 524. However, it may generally refer to congestion of the CU 520.

In an embodiment, the connection 972 is established between the DU 504 and the CU-UP 524.

In an embodiment, the at least one network slice comprises a network slice for the connection 972 and another network slice for a connection 974 between the CU 520 and CU 920 (or more particularly between CU-UP 524 and CU-UP 924). The connection 974 may be additionally be established to enable data transfer between the CUs 520, 920 (e.g. CU-UP 524 and CU-UP 924) during the transfer of DU 504 to the CU 920. Such may be beneficial to enable the UE 100, 102 to be served continuously without interruptions caused by the transfer of DU 504 from CU 520 to CU 920. The CU 920 may further comprise a CU-CP 922.

The solutions described with reference to FIG. 9 may be sometimes referred to as real-time, cross domain SLA aware load distribution based on CU-UP congestion during peak hours. Let us first discuss a specific example in which same UPF 956.

UE may be associated with CU-UP 524 with a certain load (e.g. daytime load). Daytime load may refer to load during the day (e.g. between 8 am and 5 pm). A different load (e.g. evening load) may be triggered on CU-UP 524 by large public venue in metropolitan city. Sustained CU-UP congestion may be identified by network layer element 410. Network layer element 410 may determine that CU-UP 924 is in uncongested state for a historic period of time. The network layer element 410 may further determine if service SLA requirement, latency tolerance and/or degraded service is acceptable for the UE. If not the, the network layer element 410 may trigger the transfer of DU 504 to CU-UP 924. Further, the transfer itself may cause some degradation which may also be taken into account when determining whether or not the transfer is beneficial.

The network layer element 410 may then request 982 the transport layer element 420 to create or generate two network slices (or can be referred to as transport network slices) from DU 504 to CU-UP 924 and CU-CP 524 to CU-UP 924.

Based on the request, the transport layer element 420 may calculate and determine whether two network slices can be supported, and if yes proceeds to create them. The transport layer element 420 may indicate 984 the network layer element 410 that the network slices have been created.

The network layer element 410 may further request 986 domain management 910 (e.g. RAN domain management) to establish new connection(s) 972, 974 using the generated network slices. The domain management 910 may indicate 988 the network layer element 410 about the established connection(s) 972, 974. The network layer element 410 may further move the UE 100, 102 to the new network slice utilizing at least the connection 972 (and possibly also connection 974). For example, the CU-920 may utilize same UPF 956 as CU 520.

In an embodiment, the UPF may be relocated from UPF 956 to UPF 926. The UPF relocation may be dependent on 3GPP defined SMF-CU-CP procedure(s).

In an embodiment, the domain management 910 and network layer element 410 are comprised in the same entity.

In an embodiment, the network layer element 410 is RIM 410.

In an embodiment, the transport layer element 420 is TDMC 420.

In an embodiment, the network nodes discussed above are RRUs. For example, network node 502 may be RRU 502 (as shown in the Figures) and network node 602 may be RRU 602 (as shown in the Figures).

In an embodiment, combination of one or more RRU, one or more DU, and one or more CU form a gNB.

Figure 10:
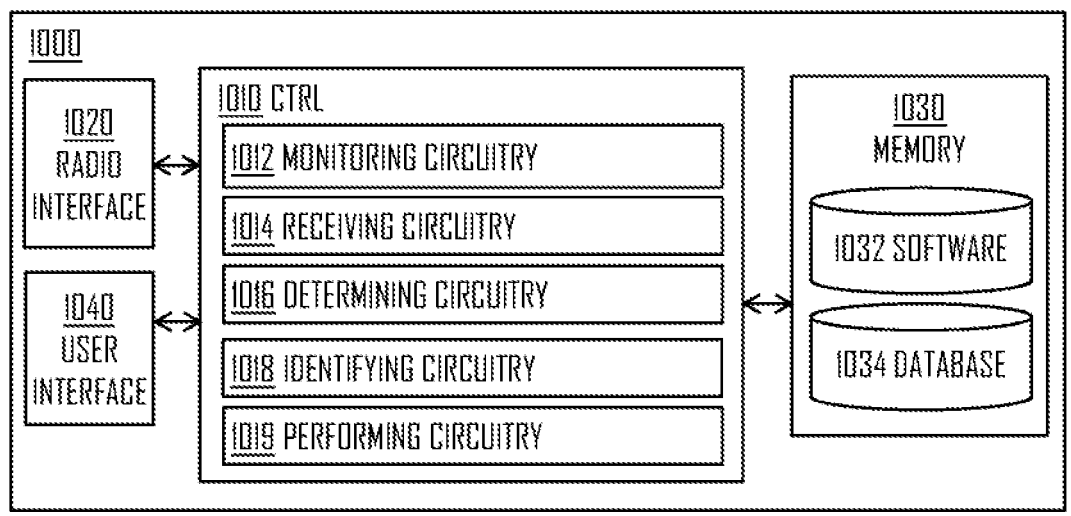
FIGS. 10 and 11 illustrate apparatuses according to some embodiments.
Figure 11:
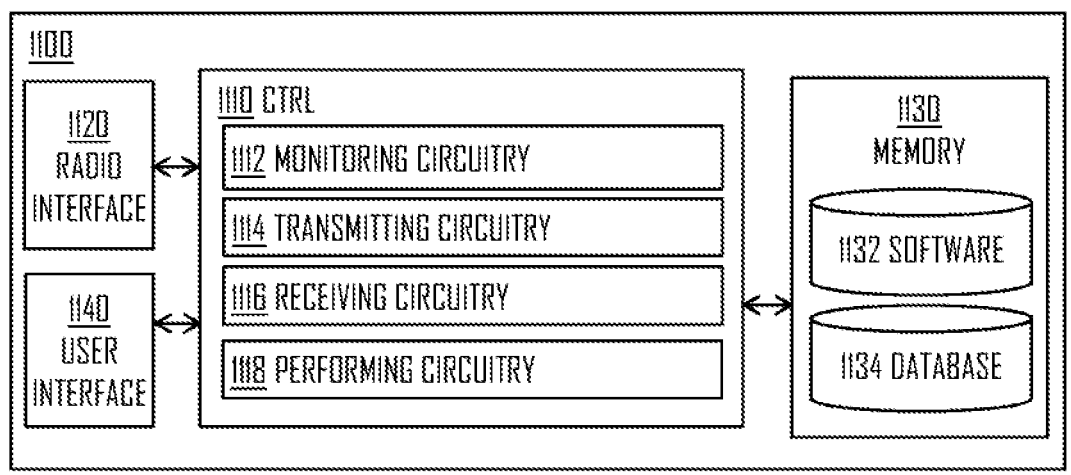

FIGS. 10 and 11 provides apparatuses 1000 and 1100 comprising a control circuitry (CTRL) 1010, 1110, such as at least one processor, and at least one memory 1030, 1130 including a computer program code (software) 1032, 1132, wherein the at least one memory and the computer program code (software) 1032, 1132, are configured, with the at least one processor, to cause the respective apparatus 1000, 1100 to carry out any one of the embodiments of FIGS. 1 to 9, or operations thereof.

Referring to FIGS. 10 and 11, the memory 1030, 1130, may be implemented using any suitable data storage technology, such as semiconductor based memory devices, flash memory, magnetic memory devices and systems, optical memory devices and systems, fixed memory and removable memory. The memory 1030, 1130 may comprise a database 1034, 1134 for storing data.

The apparatus 1000, 1100 may further comprise radio interface (TRX) 1020, 1120 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. The TRX may provide the apparatus capability to exchange messages and/or data between the elements 410, 420, 430, for example.

The apparatus 1000, 1100 may comprise user interface 1040, 1140 comprising, for example, at least one keypad, a microphone, a touch display, a display, a speaker, etc. The user interface 1040, 1140 may be used to control the respective apparatus by a user of the apparatus 1000, 1100.

In an embodiment, the apparatus 1000 may be or be comprised in a network layer element, e.g. the network layer element performing the method described with reference to FIG. 2. For example, the apparatus 1000 may be or be comprised in the network layer element 410 (e.g. RIM).

Referring to FIG. 10, the control circuitry 1010 may comprise a monitoring circuitry 1012 configured to cause the apparatus 1000 to perform at least operations of block 202; a receiving circuitry 1014 configured to cause the apparatus 1000 to perform at least operations of block 204; a determining circuitry 1016 configured to cause the apparatus 1000 to perform at least operations of block 206; an identifying circuitry 1018 configured to cause the apparatus 1000 to perform at least operations of block 208; and a performing circuitry 1019 configured to cause the apparatus 1000 to perform at least operations of block 209.

In an embodiment, the apparatus 1100 may be or be comprised in a transport layer element, e.g. the transport layer element performing the method described with reference to FIG. 3. For example, the apparatus 1100 may be or be comprised in the network layer element 420 (e.g. TDMC).

Referring to FIG. 11, the control circuitry 1110 may comprise a monitoring circuitry 1112 configured to cause the apparatus 1100 to perform at least operations of block 302; a transmitting circuitry 1114 configured to cause the apparatus 1100 to perform at least operations of block 304; a receiving circuitry 1116 configured to cause the apparatus 1100 to perform at least operations of block 306; and a performing circuitry 1118 configured to cause the apparatus 1100 to perform at least operations of block 308.

In an embodiment, at least some of the functionalities of the apparatus 1000, 1100 may be shared between two physically separate devices, forming one operational entity. Therefore, the apparatus 1000, 1100 may be seen to depict the operational entity comprising one or more physically separate devices for executing at least some of the described processes.

According to an aspect there is provided a system comprising one or more apparatuses 1000, one or more apparatuses 1100, and one or more UEs 100, 102. The system may further comprise one or more network nodes each comprising one or more RRUs, one or more DUs and one or more CUs.

In some examples the proposed inter-domain communication, and specifically the proposed second interface or similar interface, may be utilized between other domains of the wireless communication network.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 9 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 9 may be carried out by executing at least one portion of a computer program comprising corresponding instructions. E.g. a computer readable medium (e.g. non-transient computer readable medium) comprising program instructions stored thereon for causing an apparatus to perform the methods described in connection with FIGS. 1 to 9. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory comprising a computer program code, wherein the at least one memory and the computer program code are configured, with the at least one processor, to cause the apparatus to perform:
causing a network layer element of a wireless communication network at least to perform:
monitoring one or more user equipment via a first interface;
receiving network information from a transport layer element via a second interface between a network layer and a transport layer;
determining, based at least on the monitoring of the one or more user equipment and the network information, congestion or degradation associated with the one or more user equipment;
identifying a cause of the congestion or degradation associated with the one or more user equipment; and
performing one or more action to mitigate or remove the cause of the congestion or degradation, wherein the performing the one or more action comprises:
determining that a different network node is associated with a lower congestion than a currently serving network node, wherein the coverage provided by the network nodes is at least partially overlapping; and causing transferring the one or more user equipment from the currently serving network node to the determined different network node: and the performing the one or more action further comprises requesting, via the second interface, the transport layer element to increase bandwidth between a distributed unit and a control unit that are associated with the determined different network node.

2. The apparatus of claim 1, wherein the performing the one or more action further comprises requesting, via the second interface, the transport layer element to increase bandwidth between a distributed unit and a control unit serving the one or more user equipment.

3. The apparatus according to claim 1, wherein the first interface is an E2 interface.

4. The apparatus of claim 1, wherein bandwidth is requested to be increased prior to causing transferring the one or more user equipment from the currently serving network node to the different network node.

5. The apparatus of claim 1, wherein the apparatus is further configured to perform operations comprising:

determining that a control unit serving the one or more user equipment is experiencing congestion; and determining another control unit for serving the one or more user equipment, wherein the performing the one or more action comprises requesting, via the second interface from the transport layer element, generation of at least one network slice for a new connection between a distributed unit serving the one or more user equipment and the another control unit.

6. An apparatus, comprising:

at least one processor; and at least one memory comprising a computer program code, wherein the at least one memory and the computer program code are configured, with the at least one processor, to cause the apparatus to perform:

causing a transport layer element of a wireless communication network at least to perform:

monitoring one or more network parameters and storing network information based on the monitoring;

transmitting the network information to a network layer element via a second interface between a network layer and a transport layer, the network layer element monitoring one or more user equipment via a first interface;

receiving, via the second interface from the network layer element, a request to perform at least one action to mitigate or remove a cause of a congestion or degradation associated with the one or more user equipment;

performing the at least one action to mitigate or remove the cause of the congestion or degradation; and wherein the one or more user equipment are to be transferred from a currently serving network node to a different network node that is associated with a lower congestion than the currently serving network node, wherein the coverage provided by the network nodes is at least partially overlapping, and wherein the performing the at least one action comprises increasing bandwidth between a distributed unit and a control unit that are associated with the different network node.

7. The apparatus of claim 6, wherein the performing the at least one action comprises increasing bandwidth between a distributed unit and a control unit serving the one or more user equipment.

8. The apparatus according to claim 6, wherein the first interface is an E2 interface.

9. The apparatus of claim 6, wherein the bandwidth, between the distributed unit and the control unit associated with the different network node, is increased prior to transfer of the one or more user equipment from the currently serving network node to the different network node.

10. The apparatus of claim 6, wherein a distributed unit serving the one or more user equipment is associated with a control unit experiencing congestion, wherein the performing the at least one action comprises generating, based on a request via the second interface from the network layer element, at least one network slice for a new connection between the distributed unit and another control unit.

11. A method in a network layer element of a wireless communication network, the method comprising:

monitoring one or more user equipment via a first interface;

receiving network information from a transport layer element via a second interface between a network layer and a transport layer;

determining, based at least on the monitoring of the one or more user equipment and the network information, congestion or degradation associated with the one or more user equipment;

identifying a cause of the congestion or degradation associated with the one or more user equipment; and performing one or more action to mitigate or remove the cause of the congestion or degradation, wherein the performing the one or more action comprises:

determining that a different network node is associated with a lower congestion than a currently serving network node, wherein the coverage provided by the network nodes is at least partially overlapping; and causing transferring the one or more user equipment from the currently serving network node to the determined different network node: and the performing the one or more action further comprises requesting, via the second interface, the transport layer element to increase bandwidth between a distributed unit and a control unit that are associated with the determined different network node.

12. A method in a transport layer element of a wireless communication network, the method comprising:

monitoring one or more network parameters and storing network information based on the monitoring;

transmitting the network information to a network layer element via a second interface between a network layer and a transport layer, the network layer element monitoring one or more user equipment via a first interface;

receiving, via the second interface from the network layer element, a request to perform at least one action to mitigate or remove a cause of a congestion or degradation associated with the one or more user equipment;

performing the at least one action to mitigate or remove the cause of the congestion or degradation; and wherein the one or more user equipment are to be transferred from a currently serving network node to a different network node that is associated with a lower congestion than the currently serving network node, wherein the coverage provided by the network nodes is at least partially overlapping, and wherein the performing the at least one action comprises increasing bandwidth between a distributed unit and a control unit that are associated with the different network node.

13. A computer program embodied on a non-transitory computer readable medium, comprising program instructions stored thereon for causing an apparatus at least to perform a method in a network layer element of a wireless communication network, the method comprising:
  monitoring one or more user equipment via a first interface;
  receiving network information from a transport layer element via a second interface between a network layer and a transport layer;
  determining, based at least on the monitoring of the one or more user equipment and the network information, congestion or degradation associated with the one or more user equipment;
  identifying a cause of the congestion or degradation associated with the one or more user equipment; and
  performing one or more action to mitigate or remove the cause of the congestion or degradation, wherein the performing the one or more action comprises:
  determining that a different network node is associated with a lower congestion than a currently serving network node, wherein the coverage provided by the network nodes is at least partially overlapping; and
  causing transferring the one or more user equipment from the currently serving network node to the determined different network node: and the performing the one or more action further comprises requesting, via the second interface, the transport layer element to increase bandwidth between a distributed unit and a control unit that are associated with the determined different network node.

14. A computer program embodied on a non-transitory computer readable medium comprising instructions stored thereon for causing an apparatus at least to perform a method in a transport layer element of a wireless communication network, the method comprising:
  monitoring one or more network parameters and storing network information based on the monitoring;
  transmitting the network information to a network layer element via a second interface between a network layer and a transport layer, the network layer element monitoring one or more user equipment via a first interface;
  receiving, via the second interface from the network layer element, a request to perform at least one action to mitigate or remove a cause of a congestion or degradation associated with the one or more user equipment;
  performing the at least one action to mitigate or remove the cause of the congestion or degradation; and
  wherein the one or more user equipment are to be transferred from a currently serving network node to a different network node that is associated with a lower congestion than the currently serving network node, wherein the coverage provided by the network nodes is at least partially overlapping, and wherein the performing the at least one action comprises increasing bandwidth between a distributed unit and a control unit that are associated with the different network node.

* * * * *